(12) United States Patent
Guo et al.

(10) Patent No.: US 11,100,060 B2
(45) Date of Patent: Aug. 24, 2021

(54) METHOD, DEVICE AND COMPUTER PROGRAM PRODUCT FOR DATA MIGRATION

(71) Applicant: EMC IP Holding Company LLC, Hopkinton, MA (US)

(72) Inventors: Michael Jingyuan Guo, Shanghai (CN); Willey Yongwei Lu, Jiangsu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 148 days.

(21) Appl. No.: 16/555,916

(22) Filed: Aug. 29, 2019

(65) Prior Publication Data

US 2020/0341952 A1  Oct. 29, 2020

(30) Foreign Application Priority Data

Apr. 26, 2019  (CN) .......................... 201910343709.4

(51) Int. Cl.
*G06F 16/00* (2019.01)
*G06F 16/21* (2019.01)

(52) U.S. Cl.
CPC .................. *G06F 16/214* (2019.01)

(58) Field of Classification Search
CPC .... G06F 16/214; G06F 3/0604; G06F 3/0614; G06F 3/0655
See application file for complete search history.

(56) References Cited

U.S. PATENT DOCUMENTS

| | | | |
|---|---|---|---|
| 2007/0143352 A1* | 6/2007 | Dunn | G06F 16/214 |
| 2013/0339943 A1* | 12/2013 | Mallya | G06F 8/60 717/176 |
| 2015/0012571 A1* | 1/2015 | Powell | G06F 16/188 707/827 |
| 2015/0178014 A1* | 6/2015 | Nelson | G06F 3/065 711/114 |
| 2019/0155818 A1* | 5/2019 | Richman | H04L 51/04 |
| 2019/0235895 A1* | 8/2019 | Ovesea | G06F 9/4856 |
| 2019/0245928 A1* | 8/2019 | Joy | H04L 41/0813 |

* cited by examiner

*Primary Examiner* — Diedra McQuitery
(74) *Attorney, Agent, or Firm* — Amin, Turocy & Watson, LLP (57) ABSTRACT

Data migration is facilitated. An example method comprises initiating data migration from a first storage system to a second storage system, wherein the data migration is divided into stages, and the stages comprise a first stage and a second stage after the first stage. The method comprises executing tasks in a first group of tasks in the first stage in parallel, wherein the tasks comprise a first task and a second task. The method further comprises generating a third task corresponding to the first task and a fourth task corresponding to the second task in the second stage in response to determining that the first task and the second task are completed respectively. For instance, in the staged data migration process, multiple execution tasks in different stages can be executed in parallel, and thus the speed of data migration is increased and fault tolerance performance of the system is improved.

20 Claims, 8 Drawing Sheets

METHOD, DEVICE AND COMPUTER PROGRAM PRODUCT FOR DATA MIGRATION

RELATED APPLICATION

The present application claims the benefit of priority to Chinese Patent Application No. 201910343709.4, filed on Apr. 26, 2019, which application is hereby incorporated into the present application by reference herein in its entirety.

FIELD

Embodiments of the present disclosure generally relate to the field of data storage, and more specifically, to a method, device and computer program product for data migration between different storage systems.

BACKGROUND

Data migration refers to migrating data between different storage systems or platforms. For example, data may be migrated from an old storage system or platform to a new storage system or platform in the process of updating a storage system with a new storage device. Since the old storage system might store extensive data and objects to be migrated are extremely huge, it might take a long time to complete the data migration. Before completion of data migration, a user cannot directly switch to the new storage system to work normally.

In order to guarantee all objects in the old storage system are correctly migrated to the new storage system, a corresponding index needs to be created usually. Since most of daily operations are done with only metadata, metadata part and data part have to be migrated separately, and generally a multi-staged migration approach is adopted. Metadata are data which are used to describe data, describing attribute information of data so as to support functions such as storage location indicating, resource lookup and file recording. In the process of staged data migration, the metadata part of an object may be migrated first, and then the data is migrated.

SUMMARY

Embodiments of the present disclosure provide a method, device and computer program product for data migration.

In one aspect of the present disclosure, provided is a method for data migration. The method comprises: initiating data migration from a first storage system to a second storage system, wherein the data migration is divided into a plurality of stages, and the plurality of stages comprise a first stage and a second stage after the first stage; executing a plurality of tasks in a first group of tasks in the first stage in parallel, wherein the plurality of tasks comprise a first task and a second task; and in response to determining that the first task and the second task are completed, generating, in the second stage, a third task corresponding to the first task and a fourth task corresponding to the second task.

In another aspect of the present disclosure, provided is a device for data migration. The device comprises a processing unit and a memory, wherein the memory is coupled to the processing unit and has instructions stored thereon. The instructions, when executed by the processing unit, perform acts including: initiating data migration from a first storage system to a second storage system, wherein the data migration is divided into a plurality of stages, and the plurality of stages comprise a first stage and a second stage after the first stage; executing a plurality of tasks in a first group of tasks in the first stage in parallel, wherein the plurality of tasks comprise a first task and a second task; and in response to determining that the first task and the second task are completed, generating a third task corresponding to the first task and a fourth task corresponding to the second task in the second stage.

In a further aspect of the present disclosure, provided is a computer program product. The computer program product is tangibly stored on a non-transient computer readable medium and comprises machine executable instructions. The machine executable instructions, when being executed, cause a computer to perform methods or processes according to embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same elements in the example embodiments of the present disclosure.

DETAILED DESCRIPTION OF EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "comprise, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects, unless specified otherwise. Other definitions, explicit and implicit, might be included below.

Traditionally, data migration is completed in a staged fashion. For example, the metadata part of an object is migrated in a previous stage, and the data part of the object is migrated in a later stage. Although a plurality of tasks may be performed in parallel in one stage, serial processing remains between different stages. That is, the data part of an object is migrated only after migration of metadata part of all objects is completed. Since various stages of data migration are executed in series, such a traditional method is inefficient, which has low migration speed and might cause too long system downtime for a scenario where there exist numbers of objects to be migrated. In addition, a few tasks in the same stage may be executed slowly, which will slow down the entire migration process. Furthermore, due to serial processing, if a certain task in a given stage fails, then tasks in all subsequent stages cannot be executed. As a result, the entire migration process is blocked with poor fault tolerance of the storage system.

To this end, embodiments of the present disclosure propose a parallel staged data migration solution. According to embodiments of the present disclosure, in the staged data migration process, tasks in different stages are executed in parallel by using a group of objects as the basic migration unit, and thus the data migration speed can be increased. In addition, according to embodiments of the present disclosure, the failure of some task or tasks will not block the entire migration process. Thus, the migration block caused by task failure can be reduced, and the fault-tolerance performance of the system can be improved.

Basic principles and several example implementations of the present disclosure will be illustrated with reference to FIGS. 1 to 8. It should be understood these example embodiments are presented to enable those skilled in the art to better understand and further implement embodiments of the present disclosure, rather than limiting the scope of the present disclosure in any way.

Figure 1:
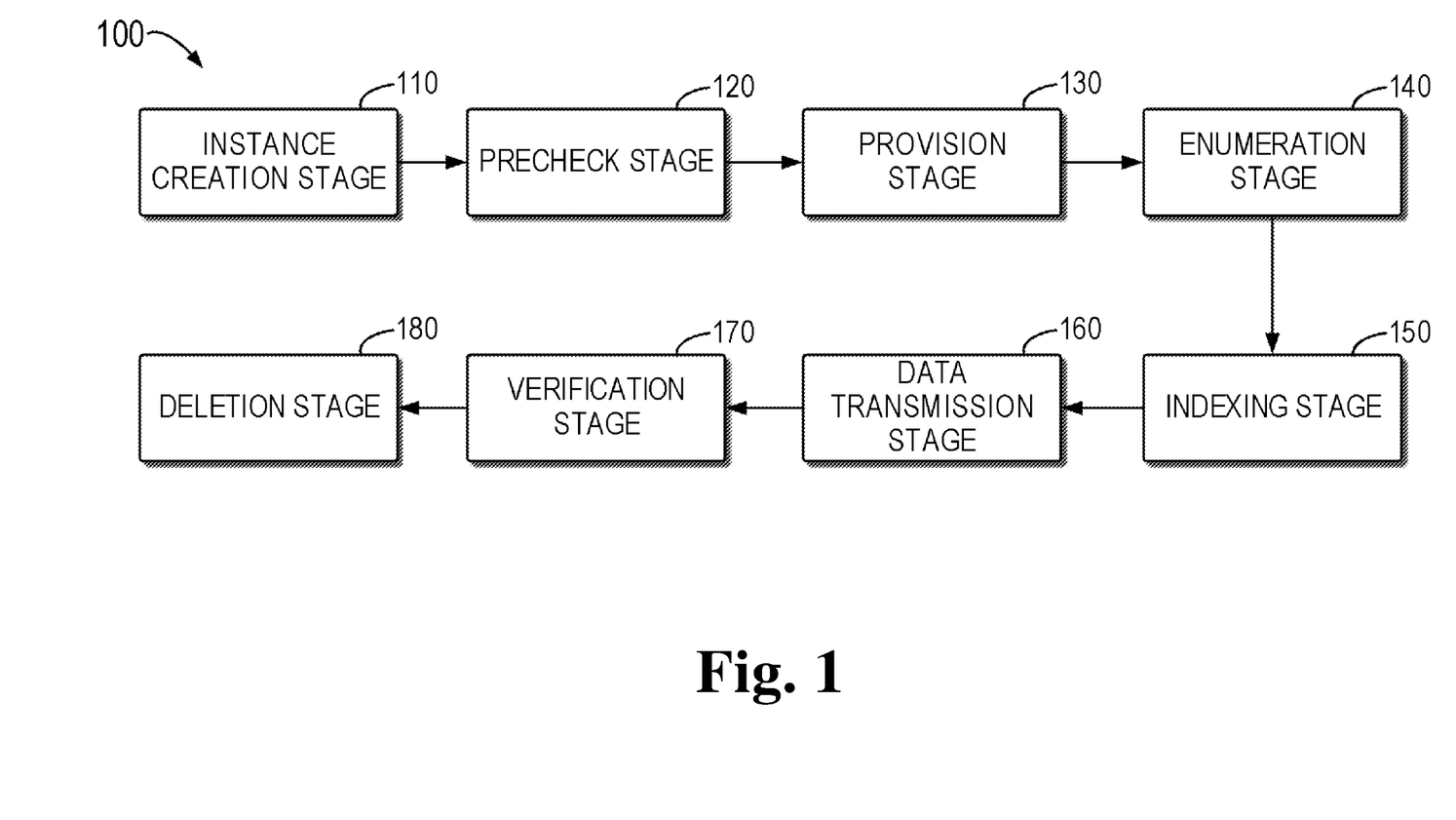
FIG. 1 shows a schematic view of a process of staged data migration according to embodiments of the present disclosure.

FIG. 1 shows a schematic view of a process 100 of staged example data migration according to embodiments of the present disclosure. As shown in FIG. 1, the example data migration process 100 from an old storage system to a new one may comprise eight stages, such as an instance creation stage 110, a precheck stage 120, a provision stage 130, an enumeration stage 140, an indexing stage 150, a data transmission stage 160, a verification stage 170 and a deletion stage 180. It should be understood although FIG. 1 shows eight stages, the data migration process may comprise more or less stages, or may be divided into different stages based on other standard. Generally, multiple stages can make data migration more effective and securer. Data migration usually reads objects from an old storage system or old platform and then writes the objects to a new storage system or new platform. To ensure all objects of the old platform are migrated correctly, an index usually needs to be created during migration.

Still with reference to FIG. 1, the instance creation stage 110 is used to create a migration instance, and the precheck stage 120 and the provision stage 130 are used to check the system and create a mapping, and these three stages may also be called migration preparation stage. After completion of the provision stage 130, a migration session is created, and then the application load may be switched to the specific migration process. The enumeration stage 140 is used to create a list of objects to be migrated and generate enumeration entries. The indexing stage 150 is used to migrate metadata of objects based on the generated enumeration entries, and at the same time, creates empty chunks based on a data length in the metadata so as to store data of objects to be migrated. The data transmission stage 160 is used to migrate data of objects so as to be stored in chunks created in the indexing stage, and may protect data after completion of data migration. The verification stage 170 is used to verify whether objects are migrated correctly based on the enumeration entries. The deletion stage 180 deletes all entries for migration after all objects have been migrated from the old storage system to the new storage system.

Traditional methods execute different stages in series, which slows down the data migration speed. Embodiments of the present disclosure can increase the data migration speed by executing tasks in different stages in parallel. In some embodiments, the method according to embodiments of the present disclosure may be used for an object storage system. Object storage is a computer data storage architecture that manages data as objects, as opposed to other storage architectures (like a file system which manages data as a file hierarchy), and block storage which manages data as blocks within sectors and blocks.

Moreover, in the data migration process, objects which are newly created in the old storage system during migration also need to be migrated. In the meanwhile, accuracy of object read operations during migration should be guaranteed, and object updating and/or deletion during migration also need/needs to be synchronized or updated.

Figure 2:
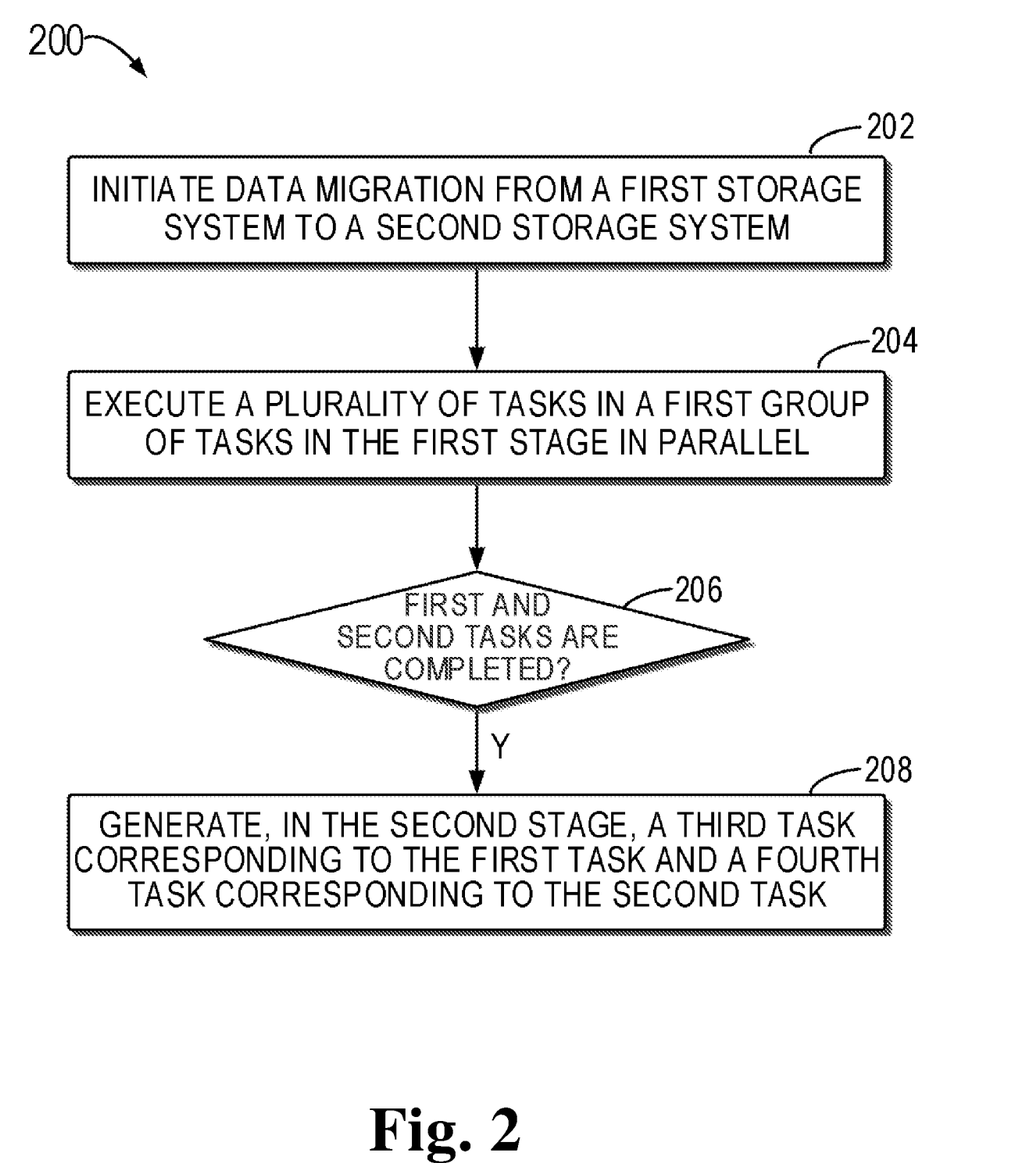
FIG. 2 shows a flowchart of a method for data migration according to embodiments of the present disclosure.

FIG. 2 shows a flowchart of a method 200 for data migration according to embodiments of the present disclosure. At 202, data migration from a first storage system to a second storage system is initiated, wherein the data migration is divided into a plurality of stages (such as some stages in the data migration process 100 of FIG. 1), and the plurality of stages comprises a first stage and a second stage after the first stage. In some embodiments, the method according to embodiments of the present disclosure may be applied to only stages that are relative time-consuming in the data migration process. For example, the method according to embodiments of the present disclosure may be applied to only the enumeration stage 140, the indexing stage 150, the data transmission stage 160 and the verification stage 170 in the data migration process 100 of FIG. 1, and other stages are still subject to the traditional serial processing method.

At 204, a plurality of tasks in a first group of tasks in the first stage are executed in parallel, wherein the plurality of tasks comprise a first task and a second task. In some embodiments, a first job executor for the first stage and a second job executor for the second stage may be created in parallel, wherein the first job executor creates a first checker (like a finalizer task) for checking whether tasks in the first stage are completed, and the second job executor creates a second checker for checking whether tasks in the second stage are completed. For example, a plurality of tasks are executed in parallel in the enumeration stage 140 as described with reference to FIG. 1.

At 206, it is determined whether both the first task and the second task are completed. If yes, then at 208 a third task corresponding to the first task and a fourth task corresponding to the second task are generated in the second stage. In some embodiments, if the first task is completed while the second task is not completed, then the third task corresponding to the first task is generated in the second stage without generating the fourth task corresponding to the second task. In some embodiments, if the first task is not completed while the second task is completed, then the fourth task corresponding to the second task is generated in the second stage without generating the third task corresponding to the first task. In addition, if neither of the first task and the second task is completed, then neither the third task nor the fourth task is generated. That is, once a certain task in the previous stage is completed, then immediately a corresponding task in the subsequent task is generated without waiting for all tasks in the previous task to be completed. In this way, tasks in different stages can be executed in parallel. Accordingly, the data migration speed is increased, and the fault tolerance of the system is improved.

Figure 3:
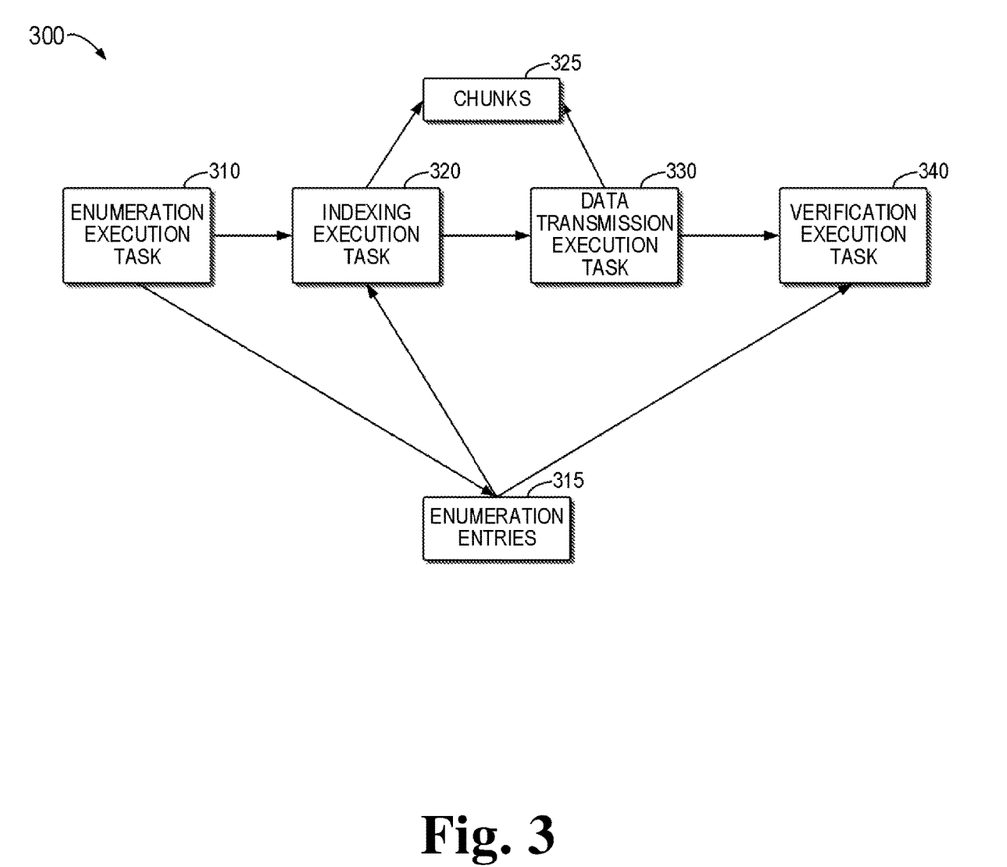
FIG. 3 shows a schematic view of a data migration process for objects according to embodiments of the present disclosure.

FIG. 3 shows a schematic view of a data migration process 300 for objects according to embodiments of the present disclosure. As shown in FIG. 3, for a given group of objects, an enumeration execution task 310 is executed in the enumeration stage, and enumeration entries 315 are generated for the group of objects. After completion of the enumeration execution task 310, an indexing execution task 320 is generated in the indexing stage. Then, the indexing execution task 320 is executed, metadata is migrated based on the enumeration entry 315, and chunks 325 for storing object data are created.

After completion of the indexing execution task 320, a data transmission execution task 330 is generated. Then, the transmission execution task 330 is executed to store the group of objects in the chunks 320. After completion of the transmission execution task 330, a verification execution task 340 is generated. Next, the verification execution task 340 is executed to check whether the group of objects are successfully migrated. Therefore, in embodiments of the present disclosure, various tasks for various groups of objects are executed in parallel based on the basic execution unit of one group of objects. For example, an indexing task for a first group of objects and a data transmission execution task for a second group of objects may be executed simultaneously, such that tasks in different stages can be executed in parallel.

Figure 4:
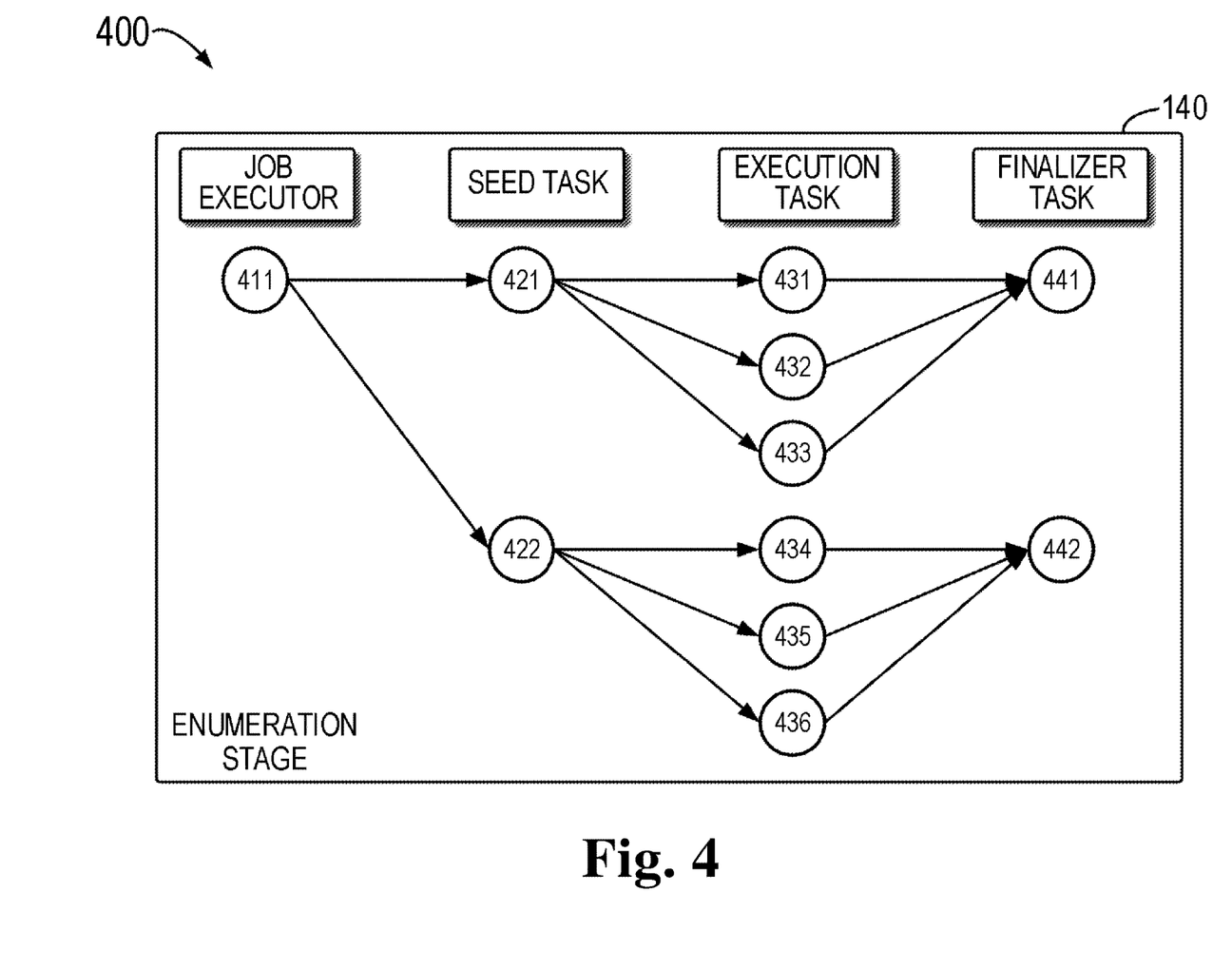
FIG. 4 shows a schematic view of an execution process in an enumeration stage according to embodiments of the present disclosure.

FIG. 4 shows a schematic view 400 of an execution process in the enumeration stage according to embodiments of the present disclosure. Before entering the enumeration stage, a job executor (such as a job executor of the enumeration stage 140, a job executor of the indexing stage 150, a job executor of the data transmission stage 160, and a job executor of the verification stage 170) of each stage in a plurality of stages to be processed in parallel is started. As shown in FIG. 4, in the enumeration stage 140, a job executor 411 first creates multiple seed tasks 421, 422 that are used as starter for creating execution tasks and multiple finalizer tasks 441, 442 that are used to check whether corresponding execution tasks in the enumeration stage are completed. Then, multiple execution tasks 431, 432, 433 to be executed in parallel are generated using the seed task 421, and multiple execution tasks 434, 435, 436 to be executed in parallel are generated using the seed task 422, and these seed tasks may be executed in parallel in the same or different devices or scanners. Each of the execution tasks may have a hash identifier (ID), so the device or scanner may select and execute a corresponding execution task based on a hash ID. The finalizer tasks 441 and 442 (i.e., checkers) are used to periodically to check whether all execution tasks are completed or not. Enumeration entries of a group of objects associated with each execution task is generated while executing each task in the enumeration stage 140.

Figure 5:
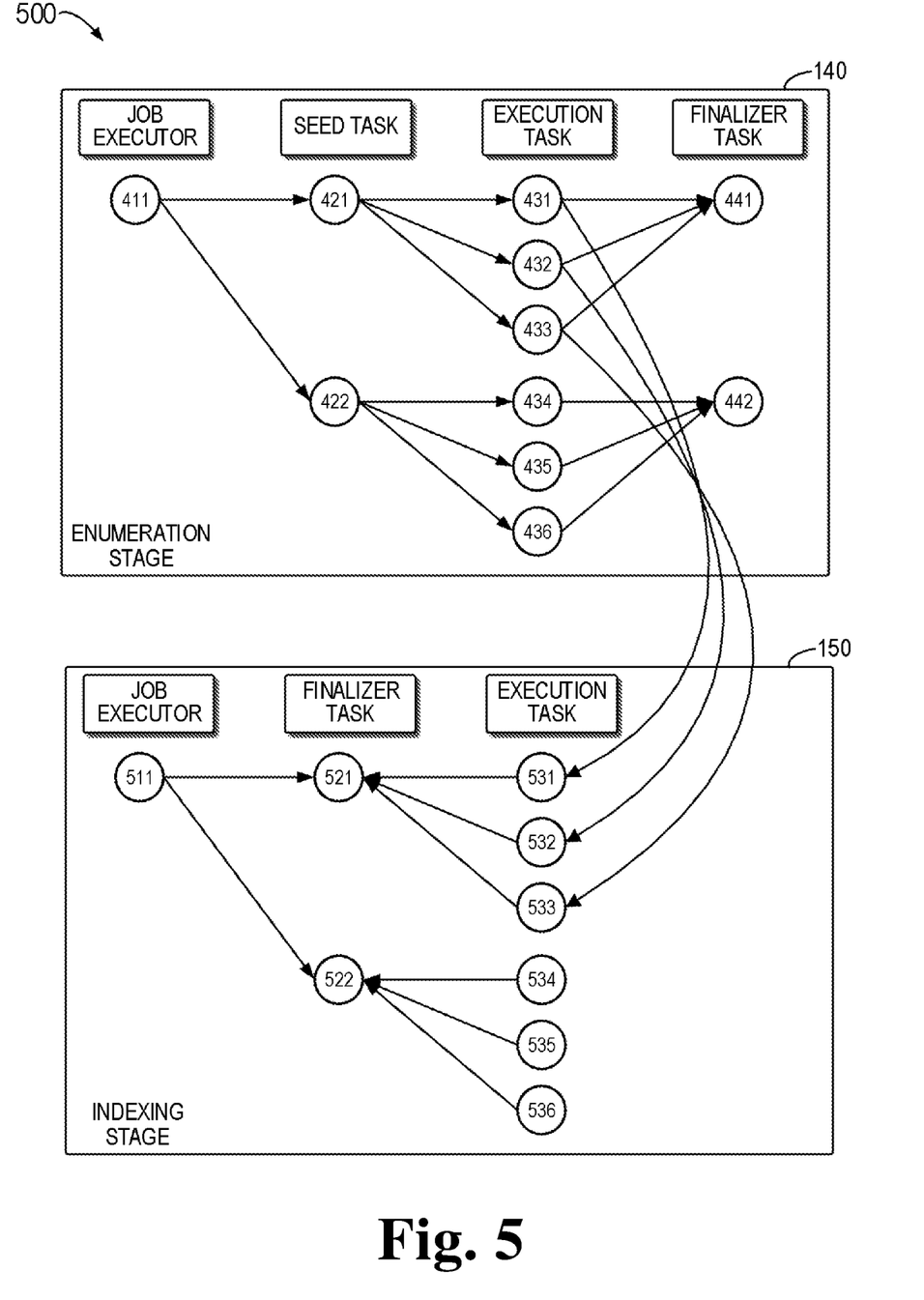
FIG. 5 shows a schematic view of an execution process in an indexing stage according to embodiments of the present disclosure.

FIG. 5 shows a schematic view 500 of an execution process in the indexing stage according to embodiments of the present disclosure. As shown in FIG. 5, in the indexing stage 150, a job executor 511 first creates multiple finalizer tasks 521 and 522, which check whether corresponding execution tasks in the indexing stage are completed based on hash ID. Unlike traditional methods, according to embodiments of the present disclosure, various execution tasks (like execution tasks 531, 532, 533, 534, 535, 536) in the indexing stage 150 are generated by execution tasks in the previous enumeration stage 140. For example, once the execution task 431 in the enumeration stage 140 is completed, the execution task 531 corresponding to the execution task 431 is generated in the indexing stage 150; once the execution task 432 in the enumeration stage 140 is completed, the execution task 532 corresponding to the execution task 432 is generated in the indexing stage 150; once the execution task 433 in the enumeration stage 140 is completed, the execution task 533 corresponding to the execution task 433 is generated in the indexing stage 150. In this way, some execution tasks in the indexing stage 150 can be executed in parallel while some execution tasks are executed in the enumeration stage 140, so that execution tasks in different stages can be executed in parallel. During executing various execution tasks in the indexing stage 150, metadata of a group of objects associated with a certain task is migrated from the old storage system to the new storage system based on a group of entries of the group of objects, and chunks for storing data of the group of objects are arranged in the new storage system. In addition, though not shown in FIG. 5, it should be understood once the execution task 434 in the enumeration stage 140 is completed, the execution task 534 corresponding to the execution task 434 is generated and executed in the indexing stage 150 no matter whether other execution tasks in the enumeration stage 140 are completed or not.

Figure 6:
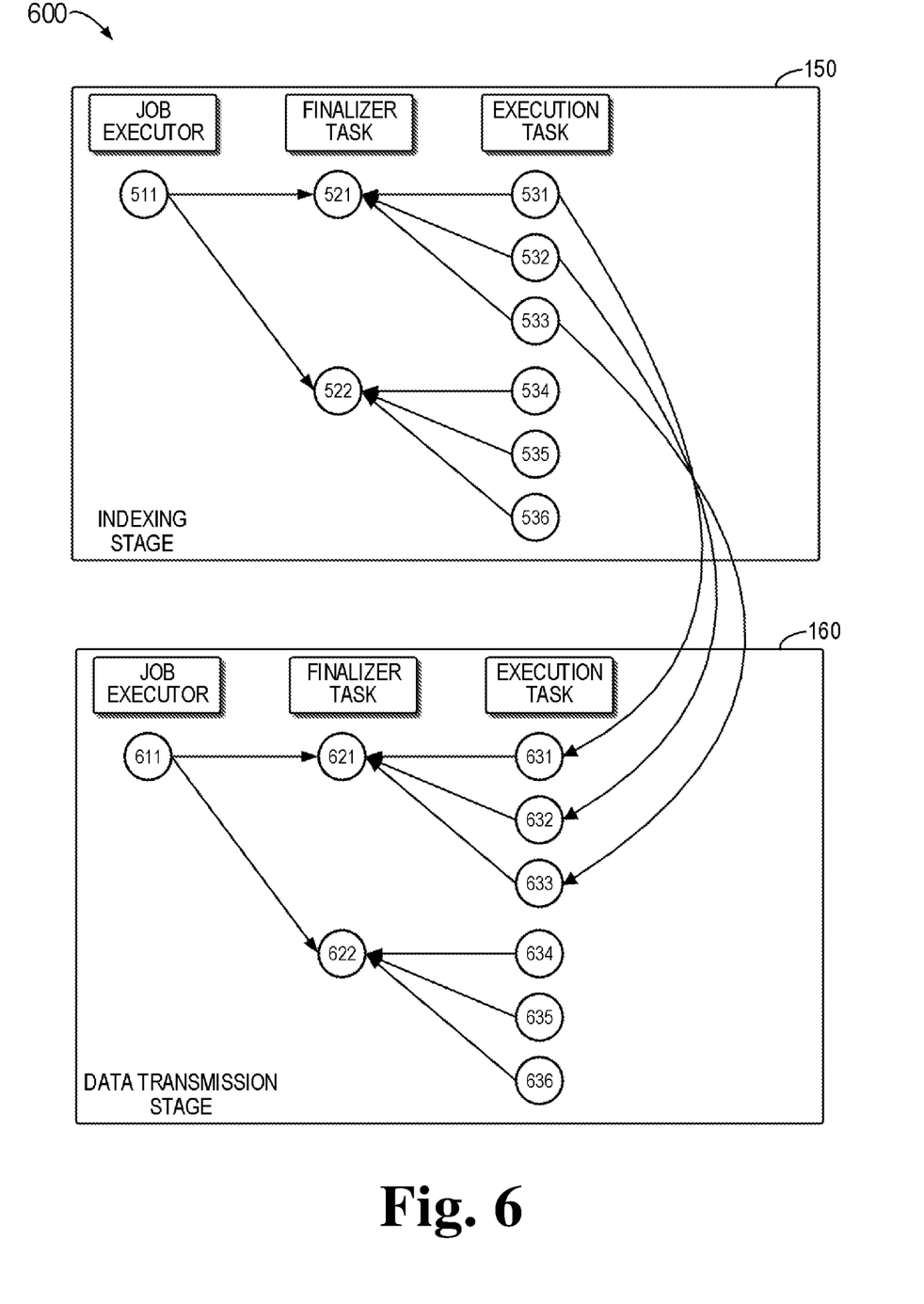
FIG. 6 shows a schematic view of an execution process in a data transmission stage according to embodiments of the present disclosure.

FIG. 6 shows a schematic view 600 of an execution process in the data transmission stage according to embodiments of the present disclosure. As shown in FIG. 6, in the data transmission stage 160, a job executor 611 first creates multiple finalizer tasks 621 and 622, which check whether corresponding execution tasks in the data transmission stage are completed or not. Unlike traditional methods, according to embodiments of the present disclosure, various execution tasks (like execution tasks 631, 632, 633, 634, 635, 636) in the data transmission stage 160 are generated by execution tasks in the previous indexing stage 150. For example, once the execution task 531 in the indexing stage 150 is completed, the execution task 631 corresponding to the execution task 531 will be generated in the data transmission stage 160; once the execution task 532 in the indexing stage 150 is completed, the execution task 632 corresponding to the execution task 532 will be generated in the data transmission stage 160; once the execution task 533 in the indexing stage 150 is completed, the execution task 633 corresponding to the execution task 533 will be generated in the data transmission stage 160. In this way, some execution tasks in the data transmission stage 160 can be executed in parallel while some execution tasks are executed in the indexing stage 150, so that execution tasks in different stages can be executed in parallel. During executing various execution tasks in the data transmission stage 160, data of various groups of objects is migrated from the old storage system to the new storage system and stored in chunks. In addition, though not shown in FIG. 6, it should be understood once the execution task 534 in the indexing stage 150 is completed, the execution task 634 corresponding to the execution task 534 is generated and executed in the data transmission stage 160 no matter whether other execution tasks in the indexing stage 150 are completed or not.

Figure 7:
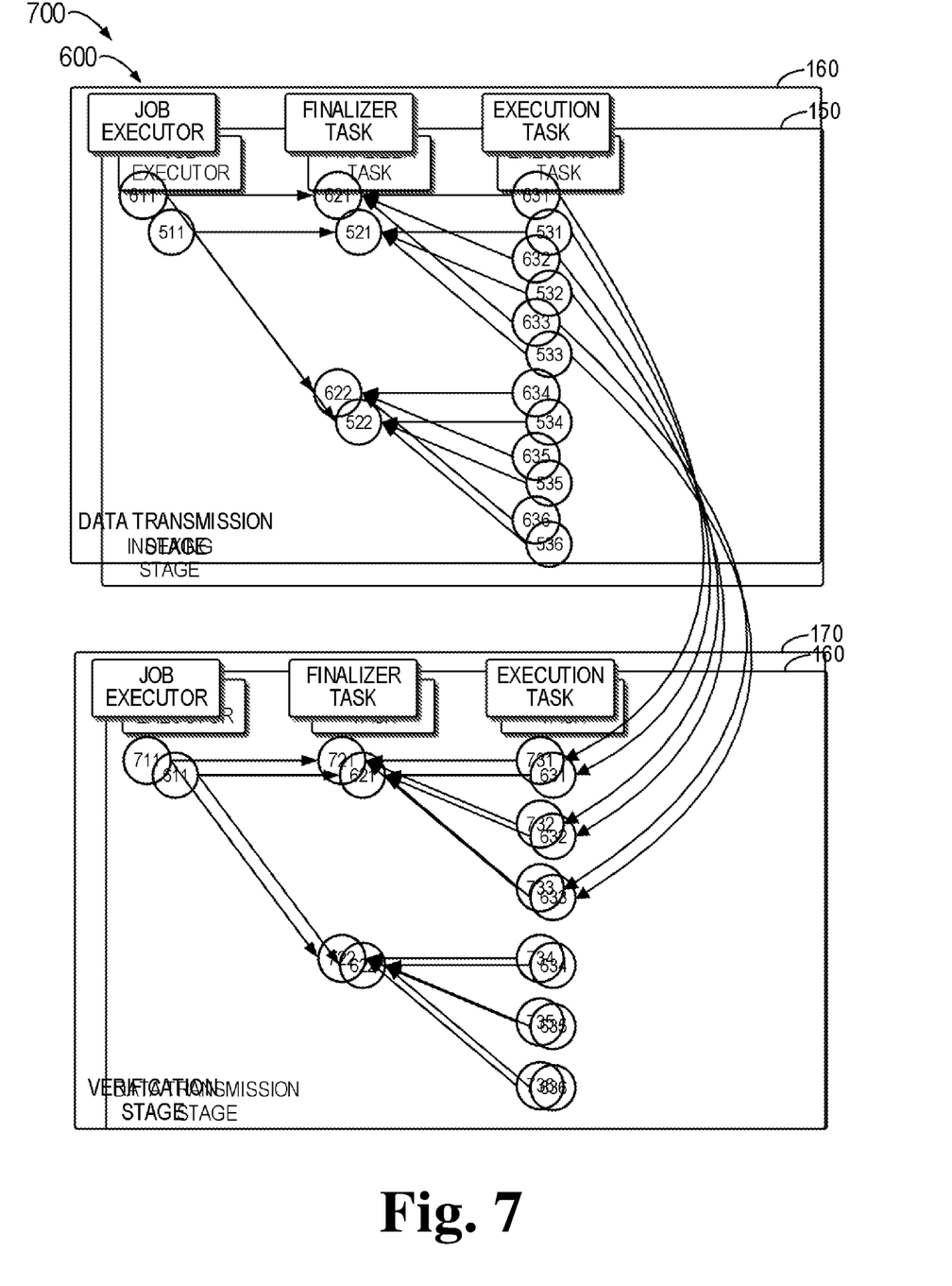
FIG. 7 shows a schematic view of an execution process in a verification stage according to embodiments of the present disclosure.

FIG. 7 shows a schematic view 700 of an execution process in the verification stage according to embodiments of the present disclosure. As shown in FIG. 7, in the verification stage 170, a job executor 711 first creates multiple finalizer tasks 721 and 722, which check whether corresponding execution tasks in the verification stage are completed or not. Unlike traditional methods, according to embodiments of the present disclosure, various execution tasks (like execution tasks 731, 732, 733, 734, 735, 736) in the verification stage 170 are generated by execution tasks in the previous data transmission stage 160. For example, once the execution task 631 in the data transmission stage 160 is completed, the execution task 731 corresponding to the execution task 631 is generated in the verification stage 170; once the execution task 632 in the data transmission stage 160 is completed, the execution task 732 corresponding to the execution task 632 is generated in the verification stage 170; once the execution task 633 in the data transmission stage 160 is completed, the execution task 733 corresponding to the execution task 633 is generated in the verification stage 170. In this way, some execution tasks in the verification stage 170 can be executed in parallel while some execution tasks are executed in the data transmission stage 160, so that execution tasks in different stages can be executed in parallel. During executing various execution tasks in the verification stage 170, it is checked whether various groups of objects are successfully migrated based on enumeration entries. In addition, though not shown in FIG. 7, it should be understood once the execution task 634 in the data transmission stage 160 is completed, the execution task 734 corresponding to the execution task 634 is generated and executed in the verification stage 170 no matter whether other execution tasks in the data transmission stage 160 are completed or not.

According to embodiments of the present disclosure, it is possible while one or more execution tasks in the enumeration stage 140 are being executed, one or more execution tasks in the indexing stage 150 are executed, one or more execution tasks in the data transmission stage 160 are executed, and/or one or more execution tasks in the verification stage 170 are executed at the same time. In this way, embodiments of the present disclosure can increase the execution speed of the system and improve the fault tolerance performance, while keeping immediate application switching and the handling of creation, read, update and deletion (CRUD) during migration. Furthermore, in embodiments of the present disclosure, one group of enumeration entries are used as a basic unit in the migration process, and the generated each group of enumeration entries may be used for subsequent indexing, data transmission and verification.

Figure 8:
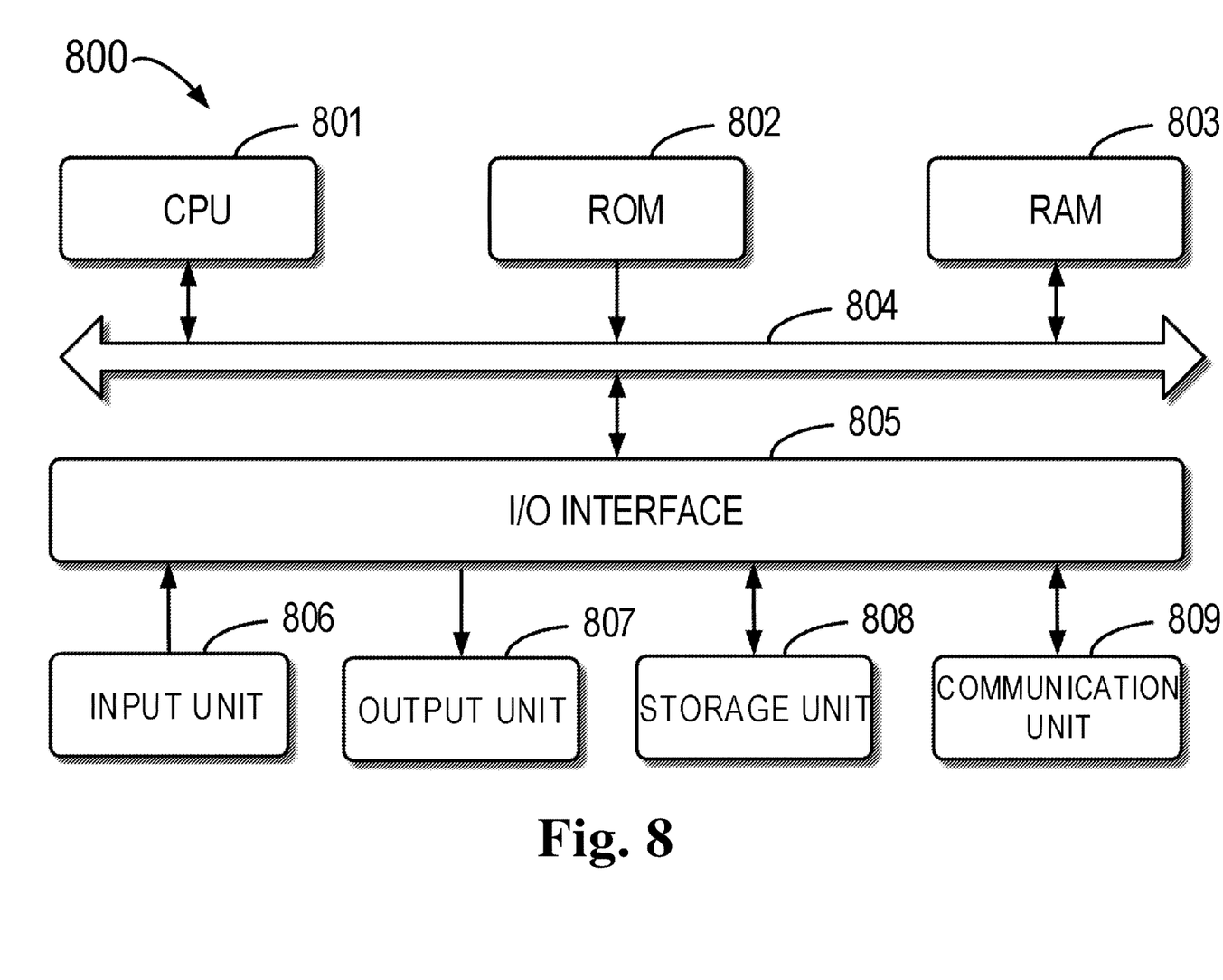
FIG. 8 shows a schematic block diagram of a device which may be used to implement embodiments of the present disclosure.

FIG. 8 shows a schematic block diagram of a device 800 suitable for implementing embodiments of the present disclosure. The device 800 may be a device or an apparatus described in embodiments of the present disclosure. As shown in FIG. 8, the device 800 comprises a central processing unit (CPU) 801 which is capable of performing various appropriate actions and processes in accordance with computer program instructions stored in a read only memory (ROM) 802 or computer program instructions loaded from a storage unit 808 to a random access memory (RAM) 803. In the RAM 803, there are also stored various programs and data required by the device 800 when operating. The CPU 801, the ROM 802 and the RAM 803 are connected to one another via a bus 804. An input/output (I/O) interface 805 is also connected to the bus 804.

Multiple components in the device 800 are connected to the I/O interface 805: an input unit 806 including a keyboard, a mouse, or the like; an output unit 807, such as various types of displays, a loudspeaker or the like; a storage unit 808, such as a disk, an optical disk or the like; and a communication unit 809, such as a network card, a modem, a wireless communication transceiver or the like. The communication unit 809 allows the device 800 to exchange information/data with other device via a computer network, such as the Internet, and/or various telecommunication networks.

The above-described methods or processes may be executed by the processing unit 801. For example, in some embodiments, the methods may be implemented as a computer software program, which is tangibly embodied on a machine readable medium, e.g. the storage unit 808. In some embodiments, a part or the entirety of the computer program may be loaded to and/or installed on the device 800 via the ROM 802 and/or the communication unit 809. The computer program, when loaded to the RAM 803 and executed by the CPU 801, may execute one or more steps or acts of the methods as described above.

In some embodiments, the methods and processes described above may be implemented as a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method, comprising:
    initiating, by a system comprising a processor, data migration from a first storage system to a second storage system, the data migration being divided into a plurality of stages, and the plurality of stages comprising a first stage and a second stage after the first stage;
    executing a plurality of tasks in a first group of tasks in the first stage in parallel, the plurality of tasks comprising a first task and a second task;
    determining whether a first state of completion of the first task and the second task is completed or not completed and whether a second state of completion of the second task is completed or not completed; and
    in response to the determining indicating that the first state of completion of the first task and the second state of completion of the second task are completed, generating, in the second stage, a third task corresponding to the first task and a fourth task corresponding to the second task.

2. The method according to claim 1, further comprising:
    in response to the determining indicating that the first state of completion of the first task is completed and that the second state of completion of the second task is not completed, generating, in the second stage, the third task corresponding to the first task, without generating the fourth task corresponding to the second task.

3. The method according to claim 1, wherein the initiating the data migration from the first storage system to the second storage system comprises:
    creating a first job executor for the first stage and a second job executor for the second stage in parallel, the first job executor creating a first checker for checking whether a task in the first stage is completed, and the second job executor creating a second checker for checking whether a task in the second stage is completed.

4. The method according to claim 3, wherein the first stage is a stage for listing objects to be migrated, and the executing the plurality of tasks in the first group of tasks in the first stage in parallel comprises:
    creating a first starter using the first job executor;
    generating the plurality of tasks using the first starter; and generating an entry of an object associated with each of the plurality of tasks.

5. The method according to claim 4, wherein the second stage is a stage for migrating metadata, and the generating, in the second stage, the third task corresponding to the first task and the fourth task corresponding to the second task comprises:
executing the third task by:
migrating metadata of a first group of objects associated with the first task from the first storage system to the second storage system based on a first group of entries of the first group of objects; and
arranging, in the second storage system, a first group of chunks for storing data of the first group of objects based on a data length of the metadata.

6. The method according to claim 5, wherein the plurality of stages further comprises a third stage for migrating data, and the method further comprises:
in response to determining that the third task is completed, generating, in the third stage, a fifth task corresponding to the third task; and
executing the fifth task by:
transmitting the data of the first group of objects from the first storage system to the second storage system;
storing the data of the first group of objects in the first group of chunks.

7. The method according to claim 6, wherein the plurality of stages further comprises a fourth stage for verifying whether objects are migrated, and the method further comprises:
in response to determining that the fifth task is completed, generating, in the fourth stage, a sixth task corresponding to the fifth task; and
executing the sixth task by verifying whether the first group of objects are successfully migrated based on the first group of entries.

8. The method according to claim 1, further comprising:
in response to determining that all objects have been migrated from the first storage system to the second storage system, deleting all entries for migration.

9. A device, comprising:
a processing unit;
a memory coupled to the processing unit and storing instructions thereon, the instructions, when executed by the processing unit, performing acts including:
initiating data migration from a first storage system to a second storage system, the data migration being divided into a plurality of stages, and the plurality of stages comprising a first stage and a second stage after the first stage;
executing a plurality of tasks in a first group of tasks in the first stage in parallel, the plurality of tasks comprising a first task and a second task;
determining whether a first state of completion of the first task and the second task is completed or not completed and whether a second state of completion of the second task is completed or not completed; and
in response to the determining indicating that the first state of completion of the first task and the second state of completion of the second task are completed respectively, generating, in the second stage, a third task corresponding to the first task and a fourth task corresponding to the second task.

10. The device according to claim 9, the acts further comprising:
in response to the determining indicating that the first state of completion of the first task is completed and that the second state of completion of the second task is not completed, generating, in the second stage, the third task corresponding to the first task, without generating the fourth task corresponding to the second task.

11. The device according to claim 9, wherein the initiating the data migration from the first storage system to the second storage system comprises:
creating a first job executor for the first stage and a second job executor for the second stage in parallel, the first job executor creating a first checker for checking whether a task in the first stage is completed, and the second job executor creating a second checker for checking whether a task in the second stage is completed.

12. The device according to claim 11, wherein the first stage is a stage for listing objects to be migrated, and the executing the plurality of tasks in a first group of tasks in the first stage in parallel comprises:
creating a first starter using the first job executor;
generating the plurality of tasks using the first starter; and
generating an entry of an object associated with each of the plurality of tasks.

13. The device according to claim 12, wherein the second stage is a stage for migrating metadata, and the generating, in the second stage, the third task corresponding to the first task and the fourth task corresponding to the second task comprises:
executing the third task by:
migrating metadata of a first group of objects associated with the first task from the first storage system to the second storage system based on a first group of entries of the first group of objects; and
arranging, in the second storage system, a first group of chunks for storing data of the first group of objects based on a data length of the metadata.

14. The device according to claim 13, wherein the plurality of stages further comprises a third stage for migrating data, and the method further comprises:
in response to determining that the third task is completed, generating, in the third stage, a fifth task corresponding to the third task; and
executing the fifth task by:
transmitting the data of the first group of objects from the first storage system to the second storage system;
storing the data of the first group of objects in the first group of chunks.

15. The device according to claim 14, wherein the plurality of stages further comprises a fourth stage for verifying whether objects are migrated, and the method further comprises:
in response to determining that the fifth task is completed, generating, in the fourth stage, a sixth task corresponding to the fifth task; and
executing the sixth task by verifying whether the first group of objects are successfully migrated based on the first group of entries.

16. The device according to claim 15, the acts further comprising:
in response to determining that all objects have been migrated from the first storage system to the second storage system, deleting all entries for migration.

17. A computer program product, tangibly stored on a non-transitory computer readable medium and comprising machine executable instructions, the machine executable instructions, when executed, cause a system to perform operations, comprising:

initiating data migration from a first storage system to a second storage system, the data migration being divided into stages, and the stages comprising a first stage and a second stage after the first stage;

executing tasks in a first group of tasks in the first stage in parallel, the tasks comprising a first task and a second task;

determining whether a first state of completion of the first task and the second task is completed or not completed and whether a second state of completion of the second task is completed or not completed; and in response to the determining indicating that the first state of completion of the first task and the second state of completion of the second task are completed respectively, generating, in the second stage, a third task corresponding to the first task and a fourth task corresponding to the second task.

18. The computer program product according to claim 17, wherein the operations further comprise:

in response to the determining indicating that the first state of completion of the first task is completed and that the second state of completion of the second task is not completed, generating, in the second stage, the third task corresponding to the first task, without generating the fourth task corresponding to the second task.

19. The computer program product according to claim 17, wherein the initiating the data migration from the first storage system to the second storage system comprises:

creating a first job executor for the first stage and a second job executor for the second stage in parallel, the first job executor creating a first checker for checking whether a task in the first stage is completed, and the second job executor creating a second checker for checking whether a task in the second stage is completed.

20. The computer program product according to claim 19, wherein the first stage is a stage for listing objects to be migrated, and the executing the in the first group of tasks in the first stage in parallel comprises:

creating a first starter using the first job executor;
generating the tasks using the first starter; and
generating an entry of an object associated with each of the tasks.

* * * * *